Patented Oct. 23, 1945

2,387,447

UNITED STATES PATENT OFFICE 2,387,447

BASIC ETHERS AND PROCESS OF MAKING SAME

Karl Hoffmann and Harald von Meyenburg, Basel, Switzerland, assignors to Ciba Pharmaceutical Products, Incorporated, Summit, N. J.

No Drawing. Application April 1, 1942, Serial No. 437,276. In Switzerland April 10, 1941

4 Claims. (Cl. 260—471)

It has been found that new basic ethers are obtained if disubstituted acetic acid esters, amides or nitriles which contain a hydroxyl group or a halogen atom in the α-position are caused to react with amino-alcohols or their reactive derivatives. As parent materials, use is made of those disubstituted acetic acid derivatives which contain aromatic, cycloaliphatic or aliphatic radicals as substituents, such as α:α-diphenyl-α-hydroxy-, α-phenyl-α-alkyl-α-hydroxy-, α-phenyl-α-cyclohexyl-α-hydroxy-, or α:α-dicyclohexyl-α-hydroxy-acetic acid ester or their α-halogen derivatives. In place of the esters, the nitriles or amides of the above mentioned compounds may also be used.

For the purpose of the reaction, use may be made of open-chain or cyclic amino-alcohols, as well as of their reactive derivatives. Special emphasis should be laid here on amino-alcohols which are substituted at the nitrogen atom, such as dialkylamino-alkanols, piperidine-alkanols, dialkylamino-cyclohexanols, tropines, as well as reactive esters of such amino-alcohols, such as their esters with halogen hydrides, aryl sulfonic acids and the like. The present reaction is preferably carried out in the presence of solvents for example, ether, benzene, xylene and the like. If desired, it may take place in the presence of condensing agents, such as alkalis, alkali amides or alkali carbonates.

By addition of alkyl halides, alkylene halides, aryl sulfonic acid esters, dialkyl sulfates, or arylalkyl halides, quaternary ammonium compounds of the basic ethers described above can be obtained in the usual manner.

If desired, the compounds obtained can be worked up still further. Thus, for example, the corresponding acids, esters or amides can be obtained from the nitriles, which, on the other hand, may also be converted into ketimides (by the Grignard reaction) and these, in their turn, into ketones, by saponification.

The new basic ethers, which all contain four substituents at the carbon atom carrying the ether group, possess interesting pharmacological properties, in so far as they are strongly spasmolytically active. The new compounds are appreciably more active than the comparable basically substituted ethers of the phenylacetic acid series, which contain only one substituent in addition to the ether group, such as, for example, α-phenyl-α-diethylaminoethoxy-acetic acid ester.

The following examples illustrate the invention, but are not to be regarded as limiting it in any way.

Example 1

23 parts of powdered sodium are covered with 2000 parts of absolute ether. Whilst stirring, 256 parts of benzilic acid ethyl ester are dropped in, and the reaction mixture is boiled under reflux until the reaction is complete. 150 parts of chlorethyldiethylamine are now introduced, heating is continued for 4 hours under reflux, 1500 parts of absolute toluene are added, the ether is removed by distillation, and the residue is heated for a further 4 hours on the water bath. On cooling, the reaction residue is extracted with dilute hydrochloric acid; the base is precipitated by alkali as an oil and is taken up in ether. The ethereal solution is dried, evaporated and the residue distilled under a high vacuum. The α:α-diphenyl-α-diethylaminoethoxyacetic acid ethyl ester distils at 148–151° C. under 0.08 mm. of mercury.

The same compound is obtained by the reaction of diphenyl-bromacetic acid ethyl ester with sodium diethylaminoethanolate in toluene solution.

If α-phenyl-α-alkyl-α-hydroxyacetic acid esters are used as parent material, α-phenyl-α-alkyl-α-diethylaminoethoxyacetic acid esters, for example, such as α-ethyl-, α-propyl- or α-isopropyl derivatives, are obtained. In a similar manner, also, basic ethers of α-phenyl-α-cyclohexyl-α-hydroxy-, α:α-dicyclohexyl-α-hydroxy-, α-phenyl-α-naphthyl-α-hydroxy-, or diphenylene-α-hydroxy-acetic acid esters can be obtained.

Example 2

If the benzilic acid ethyl ester in Example 1 be replaced by 242 parts of benzilic acid methyl ester, α:α-diphenyl-α-diethyl-amino-ethoxyacetic acid methyl ester is obtained in good yield. It distils at 164–165° C. under 0.14 mm. of mercury.

Example 3

If the benzilic acid ethyl ester in Example 1 be replaced by 270 parts of benzilic acid n-propylester, α:α-diphenyl-α-diethylamino-ethoxyacetic acid-n-propyl ester, B. P. 175°/0.13 mm. is obtained.

Example 4

If the chlorethyldiethylamine in Example 1 be replaced by 160 parts of chlorethylpiperidine, α:α-diphenyl-α-piperidine-ethoxyacetic acid ethyl ester, B. P. 160–163° C./0.11 mm. is obtained in good yield.

In a similar manner, α:α-diphenyl-α-tropine-hydroxyacetic acid esters, α:α-diphenyl-α-piperidino-ethoxyacetic methyl ester of B. P. 170–173° C./0.13 mm. and α:α-diphenyl-α-piperidino-ethoxyacetic acid-n-propyl ester, B. P. 165–170° C./0.1 mm. are obtained.

*Example 5*

If the chlorethyldiethylamine in Example 1 be replaced by γ-chlorpropyldiethylamine, α:α-diphenyl - α - diethylaminopropyl-oxy-acetic acid ethyl ester, B. P. 151–157° C./0.05 mm. is obtained.

*Example 6*

4.6 parts of sodium are caused to react with 24 parts of diethylaminoethanol in 200 parts of toluene. When the sodium has dissolved, the mixture is allowed to react with 54 parts of α:α-diphenyl-α-bromo-acetonitrile (prepared by bromination of diphenylacetonitrile). The product is worked up as described in Example 1, and α:α-diphenyldiethylaminoethoxyacetonitrile is obtained as oil of high boiling point. If this nitrile be allowed to react in the usual manner with Grignard reagents, corresponding ketones are obtained. For example, by causing the nitrile to react with ethylmagnesium bromide, diphenyl-diethylaminoethoxymethyl-ethyl ketone is obtained.

*Example 7*

2.3 parts of powdered sodium are covered with 200 parts of absolute ether, and 12 parts of dry diethylaminoethanol are added. The reaction mixture is heated under reflux until the sodium has dissolved. 24.5 parts of α:α-diphenyl-α-chloracetamide are introduced and the mixture is boiled for 8 hours under reflux whilst stirring. The ethereal solution is extracted with dilute hydrochloric acid, and α:α-diphenyl-α-diethylaminoethoxyacetamide is precipitated from the acid solution by addition of a solution of potash.

What we claim is:

1. α:α-Diphenyl - α - dialkylaminoalkoxy-acetic acid-alkyl esters.
2. α:α-Diphenyl-α-diethylaminoethoxy - acetic acid ethylester.
3. The α:α-diphenyl acetic acid alkyl esters which also contain in α-position an amino-substituted aliphatic ether group.
4. A member selected from the group consisting of the α-aryl:α-aryl-, α-aryl:α-alkyl-, α-aryl:α-cycloalkyl- and α-cycloalkyl:α-cycloalkyl- acetic acid esters, amides and nitriles which also contain in α-position an amino-substituted aliphatic ether group.

KARL HOFFMANN.
HARALD von MEYENBURG.